US010057665B2

(12) United States Patent
Dupuis et al.

(10) Patent No.: US 10,057,665 B2
(45) Date of Patent: *Aug. 21, 2018

(54) OPTICAL SWITCH FABRIC WITH BIAS CONTROL

(71) Applicant: INTERNATIONAL BUSINESS MACHINES CORPORATION, Armonk, NY (US)

(72) Inventors: Nicolas Dupuis, New York, NY (US); Daniel M. Kuchta, Patterson, NY (US); Benjamin G. Lee, Ridgefield, CT (US); Alexander Rylyakov, Staten Island, NY (US); Clint L. Schow, Santa Barbara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/249,998

(22) Filed: Aug. 29, 2016

(65) Prior Publication Data

US 2017/0238075 A1  Aug. 17, 2017

Related U.S. Application Data

(63) Continuation of application No. 15/009,084, filed on Jan. 28, 2016, now Pat. No. 9,485,552.

(51) Int. Cl.
*H04Q 11/02* (2006.01)
*H04Q 11/00* (2006.01)
*H04B 10/079* (2013.01)

(52) U.S. Cl.
CPC ... *H04Q 11/0005* (2013.01); *H04B 10/07955* (2013.01); *H04Q 2011/0039* (2013.01); *H04Q 2011/0049* (2013.01)

(58) Field of Classification Search
CPC .......... H04Q 11/01; H04Q 11/03; H04Q 11/05
See application file for complete search history.

(56) References Cited

U.S. PATENT DOCUMENTS 9,485,552 B1 * 11/2016 Dupuis .............. H04Q 11/0005
2003/0063839 A1 * 4/2003 Kaminski .......... H04Q 11/0005
385/17

OTHER PUBLICATIONS

L. Chen et al., "Digitally Tunable Optical Power Equalization for Large Port Count Optical Switches", OFC/NFOEC Technical Digest, OSA, 2013.*

(Continued)

*Primary Examiner* — Shi K Li
(74) *Attorney, Agent, or Firm* — Tutunjian & Bitetto, P.C.; Keivan Razavi (57) ABSTRACT

Methods and systems for bias control in an optical switch fabric include monitoring optical power at outputs of a plurality of switch elements in an N×N switch fabric that has N inputs, N outputs, and M≥2 stages. A bias control of a first of the plurality of switch elements is adjusted. It is determined whether the optical power at the outputs of the first switch element after bias control adjustment conform more closely to a predetermined criterion relative to the monitored optical power at the outputs of the first switch element prior to adjustment. The adjusting and determining steps are repeated for each of the remainder of the plurality of switch elements.

15 Claims, 9 Drawing Sheets

(56) References Cited

OTHER PUBLICATIONS

A. Albores-Mejia et al. "320 Gb/s Data Routing in a Monolithic Multistage Semiconductor Optical Amplifier Switching Circuit", ECOC 2010, IEEE, Sep. 2010.*
List of IBM Patents or Patent Applications Treated as Related dated Aug. 29, 2016, 2 pages.

* cited by examiner

OPTICAL SWITCH FABRIC WITH BIAS CONTROL

STATEMENT REGARDING FEDERALLY SPONSORED RESEARCH OR DEVELOPMENT

This invention was made with Government support under Contract Number: W911NF-12-2-0051 awarded by Defense Advanced Research Projects Agency (DARPA). The Government has certain rights to this invention.

BACKGROUND

Technical Field

The present invention relates to optical switching and, more particularly, to bias control in an optical switch with a large number of switch units.

Description of the Related Art

High-port-count optical switch fabrics are receiving increased interest in many environments, including datacenters, cloud computing, and high-performance computers. Existing switch fabrics are implemented using, e.g., microelectromechanical systems or are integrated onto a single chip using, e.g., silicon photonics. Photonic integration is used to provide a smaller footprint, lower cost, and lower power consumption, and may include a large number of optical devices that need to be stabilized and controlled for proper operation.

The elementary switching element is an on-off device that routes an optical signal from one input to one output. The input/output port configuration may be, e.g., 1×2, 2×2, or 2×1 depending on switch matrix arrangement. However, to minimize the error rate and/or signal-to-noise ratio degradation of an optical signal transmitted through the switch fabric, each switching element includes low insertion loss and low optical crosstalk, which can be achieved only if each of the switching elements is biased correctly.

There are multiple causes for the bias point of a switching element to drift, such as temperature, stress, and aging, and initial bias can differ from one element to the next due to fabrication variations or imperfections.

SUMMARY

A method for bias control in an optical switch fabric includes monitoring optical power at outputs of a plurality of switch elements in an N×N switch fabric that has N inputs, N outputs, and M≥2 stages. A bias control of a first of the plurality of switch elements is adjusted. It is determined, using a processor, whether the optical power at the outputs of the first switch element after bias control adjustment conform more closely to a predetermined criterion relative to the monitored optical power at the outputs of the first switch element prior to adjustment. The adjusting and determining steps are repeated for each of the remainder of the plurality of switch elements.

A method for bias control in an optical switch fabric includes monitoring optical power at outputs of a plurality of Mach-Zehnder interferometers in an N×N switch fabric that has N inputs, N outputs, and M≥2 stages by tapping one or more outputs of a final stage of the Mach Zehnder interferometers and measuring the tapped outputs using a photodetector. The measured tapped outputs are tone demultiplexed in accordance with a unique radio frequency tone assigned to each respective Mach-Zehnder interferometer. A bias control of a first of the plurality of switch elements is adjusted. It is determined, using a processor, whether the optical power at the outputs of the first switch element after bias control adjustment conform more closely to a predetermined harmonic signature relative to the monitored optical power at the outputs of the first switch element prior to adjustment. The steps of adjusting and determining are repeated for each of the remainder of the plurality of switch elements.

An optical switch fabric including a plurality of switch elements in an N×N arrangement that has N inputs, N outputs, and M≥2 stages. Each switch element includes a bias control configured to adjust a bias of the respective switch element. A plurality of photodetectors are configured to measure optical power at outputs of the plurality of switch elements. A processor is configured to trigger adjustment by the respective bias controls and to determine, for each switch element, whether the optical power at the output of each switch element conforms more closely to a predetermined criterion relative to the optical power at the output of that first switch element after an adjustment of that first switch element.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention provide bias control for optical switches with a large number of switch units. The exemplary switch units described herein are Mach-Zehnder-interferometer-based optical switches. The present embodiments employ a bias controller and photodetectors to sense the switch outputs and to adjust and correct the optical phase of the elementary switch units. In one embodiment, the bias controller uses digital signal processing to provide feedback control to each elementary switching cell based on a signal from the photodetectors. This enables monitoring and control of all elementary cell biases in the entire switch fabric, improving the reliability and performance of large optical switch fabrics (e.g., larger than 2×2).

Figure 1:
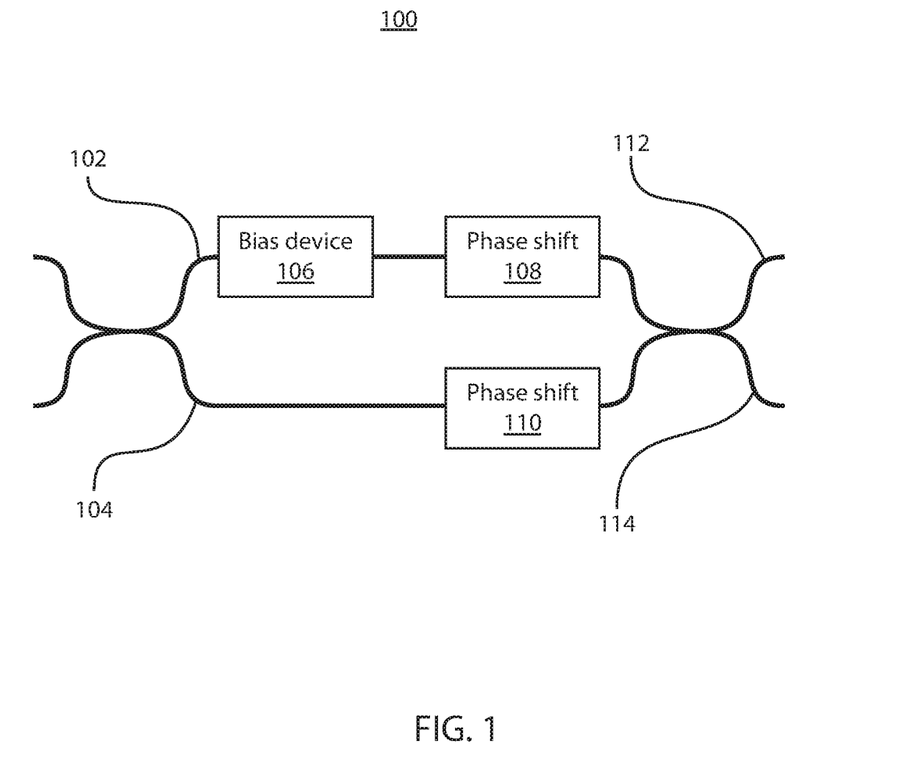
FIG. 1 is a diagram of a Mach-Zehnder interferometer used as a switch element in a switch fabric in accordance with the present principles.

Referring now to the drawings in which like numerals represent the same or similar elements and initially to FIG. 1, a diagram of a switching element 100 is shown. The switching element 100 is described herein as being a 2×2 Mach-Zehnder switch, but it should be understood that the switching element 100 may alternatively be implemented as a 1×2, 2×1, or as an arbitrary l×k switch having l inputs and k outputs. The switching element may alternatively be implemented using a different type of switch architecture. A Mach-Zehnder switch operates on the principle of controlling interference by modulating an optical phase between a first branch 102 and a second branch 104. Depending on the optical phase difference between the branches 102 and 104 of the interferometer, the switch can route light to either output.

The first branch 102 includes a biasing device 106 and a phase shifter 108, while the second branch 104 includes only a phase shifter 110. Depending on the optical phase difference between the branches 102 and 104, set by the respective phase shifters 108 and 110, the switch 100 can route light to either output 112 or output 114. It should be understood that the depicted embodiment operates in push-pull, with phase shifters on each branch. An alternative embodiment is a single-ended switch with a phase shifter on only one branch. The biasing device 106 sets the Mach-Zehnder interferometer either at its maximum transmission ($\Delta\phi=0$) or at its quadrature point ($\Delta\phi=\pi/2$), depending on whether the switching cell is operated single-ended or push-pull. Here, $\Delta\phi$ represents the optical phase difference between the branches 102 and 104 of the switch 100. It should be understood that the biasing device 106 can be implemented in either arm of the interferometer, or in both arms, as both single-ended and push-pull operation.

A bias control may be implemented as, e.g., a feedback control loop, where a fraction of the output optical power is detected by a photodetector. The resulting electrical current is then used to determine how to adjust the bias drift, if any, of the switch 100 and the biasing device 106 is used to correct for the drift.

The biasing device 106 may control the phase by any appropriate mechanism. It is particularly contemplated that the biasing device 106 may be implemented as a heater that employ, e.g., thermooptic resistive heating to adjust the optical phase and may be modulated by, e.g., a low frequency, multitone radio frequency signal (e.g., about 5 to about 500 kHz).

The phase shifters 108 and 110 may control the phase of their respective branches by any appropriate mechanism. It is particularly contemplated that the phase shifters 108 and 110 may use electro-optic or thermo-optic effects to control the phase shift of a signal.

Figure 2:
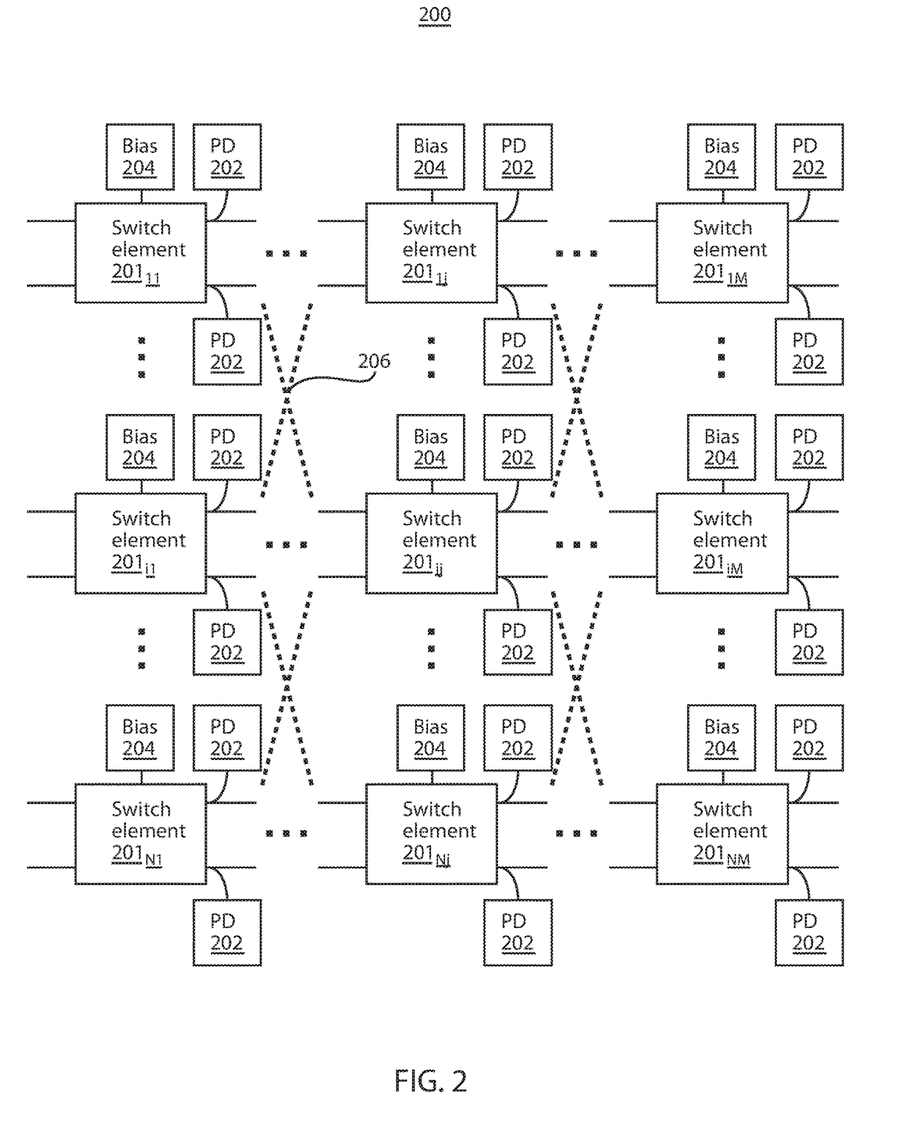
FIG. 2 is a diagram of a switch fabric in accordance with the present principles.

Referring now to FIG. 2, a (2N)×(2N) switch fabric 200 is shown (having 2N inputs and 2N outputs) that includes an M×N matrix of switching elements 201. The switching fabric 200 includes M cascading stages (shown as vertical columns of switching elements 100). Between each stage of switch elements a series of crossed waveguides 206 is included to shuffle the order of the outputs of stage j prior to becoming the inputs of stage j+1. This embodiment monitors the outputs of each switching element 201 using respective photodetectors 202, tapping the outputs (at, e.g., 1% of the output optical power) to determine the relative optical power of each output. This monitored output information for each switching element 201 is used to determine the bias of the switching element 100 (e.g., if there is crosstalk or other distortion between the outputs) so that the bias can be controlled or corrected. For this to be plausible, at least 1 light source, such as a laser or an LED, is used at each switch element 201 in the first stage of the switch fabric 200.

In this example, switch fabric 200 uses switching elements 201 in a 2×2 configuration, with two inputs and two outputs, but other fabrics could be built with switching elements 201 in, e.g., a 2×1 or 1×2 configuration. In this embodiment, each switching element 201 has a respective bias control 204 that receives output information and uses the output information to control the bias of the respective switching element 201. Additionally, in this example, the number of switch fabric inputs N and switch fabric outputs N is identical. However, other fabrics could be built by arranging switch elements in a manner that provides $N_1$ inputs to the switch fabric and $N_2$ outputs to the switch fabric, where $N_1 \neq N_2$.

Figure 3:
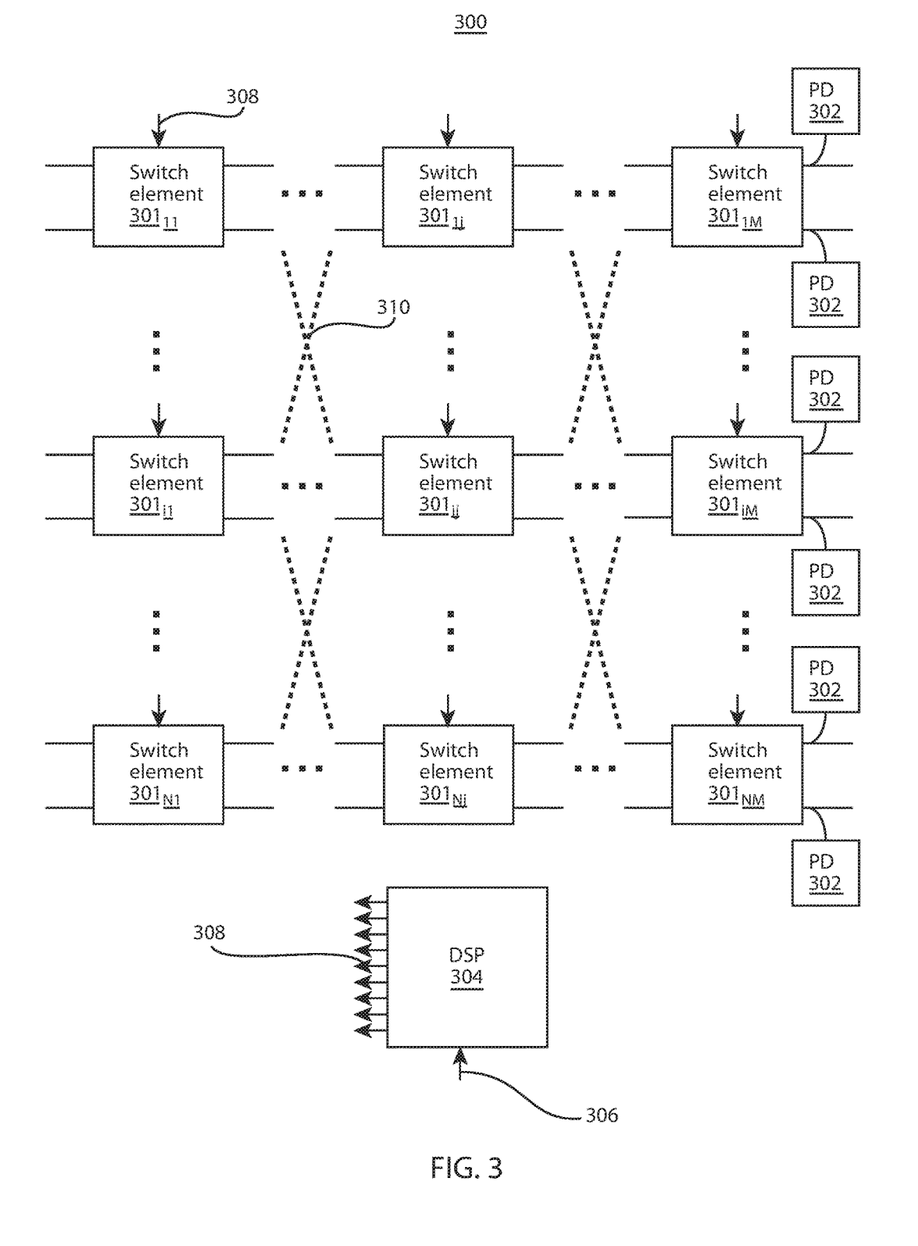
FIG. 3 is a diagram of a switch fabric in accordance with the present principles.

Referring now to FIG. 3, an alternative embodiment of a switch fabric 300 is shown. As above, this is an 2N×2N switch fabric having N inputs and N outputs, implemented as an M×N matrix of switch elements 301. Between each stage of switch elements 301, a series of crossed waveguides 310 is included to shuffle the order of the outputs of stage j prior to becoming the inputs of stage j+1. Rather than measuring the outputs at each switch element 301, only the last column of switch elements $301_{i,M}$ is measured by photodetectors 302 using, e.g., a 1% power tap. The outputs of the photodetectors are combined and passed as one or more inputs 306 to a digital signal processing block 304 that handles gain control for all of the respective switch elements 301 using the M×N gain control outputs 308. Photodetector outputs may be combined by serializing, routing as multiple lanes in parallel, multiplexed, superimposed on a single wire, etc.

Digital signal processing block 304 includes all of the electronics and decision circuitry for setting and correcting the biases. Each of the switch elements 301 is modulated by a different tone, with the outputs at the photodetectors 302 being a multitone signal. Digital signal processing block 304 demultiplexes the different tones to obtain information about each switching element 301.

Figure 4:
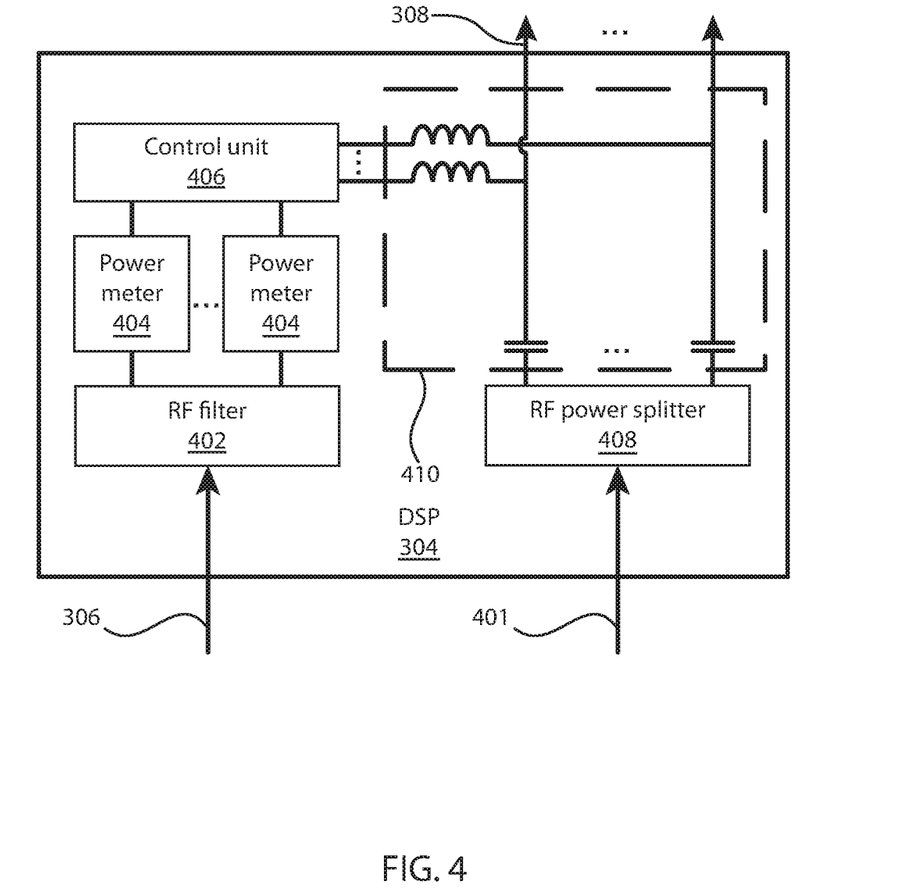
FIG. 4 is a block diagram of a digital signal processor in accordance with the present principles.

Referring now to FIG. 4, additional detail is provided for the digital signal processing block 304. One photodetector input 306 is provided by the photodetectors 302 and a low-frequency radio frequency multitone input 401 is provided by, e.g., a signal generator. Other implementations, such as one where the multitone input 401 uses separate wires, each carrying different low-frequency radio frequency tones, or one where the RF power splitter is replaced by a bank of RF filters, should be understood to be alternate embodiments covered under the current invention. The multitone input 401 is split by power splitter 408 into M×N signals, each of which is connected to the radio frequency inputs of separate bias-tees 410. A bias-tee is a three-port network used for setting a direct current bias point without disturbing other components.

A control unit 406 sets the direct current port of the bias-tees 410. The outputs of the bias-tees 410 are connected to the respective bias controllers 106 of the individual switching elements 301. The control unit 406 determines the optimized biases by processing the input signal 306 from the photodetectors 302 in the frequency domain by frequency demultiplexing the input signal using, for the example from the figure, passive radio frequency filters 402. Analog-to-digital converters followed by an additional digital signal processing unit could be used to replace the RF filters 402 and the power meters 404 in an alternate embodiment. Power meters 404 convert the demultiplexed respective frequencies using, e.g., analog to digital converters. Depending on the driving condition of the switching elements 301 (e.g., single-ended or push-pull), the control unit 406 adjusts the bias to minimize either the first harmonic (in the case of single-ended) or the second harmonic (in the case of push-pull) of the signal.

By defining a distinct frequency for each switching element 301, the digital signal processing block 304 can monitor each switching element 301 at the same time. For example, in the case of a switch having four switching elements, the radio frequency input signal 402 would have four tones: $f_0$, $f_1$, $f_2$, and $f_3$. If the switching elements 301 are driven push-pull, the control unit 406 minimizes the tones $2f_0$, $2f_1$, $2f_2$, and $2f_3$ from the photodetector input 306. The amplitude of the radio frequency signal should be low enough not to perturb the switch elements 301 during operation. The separation between the frequencies should also be selected to avoid any overlap between harmonics from different devices.

Figure 5:
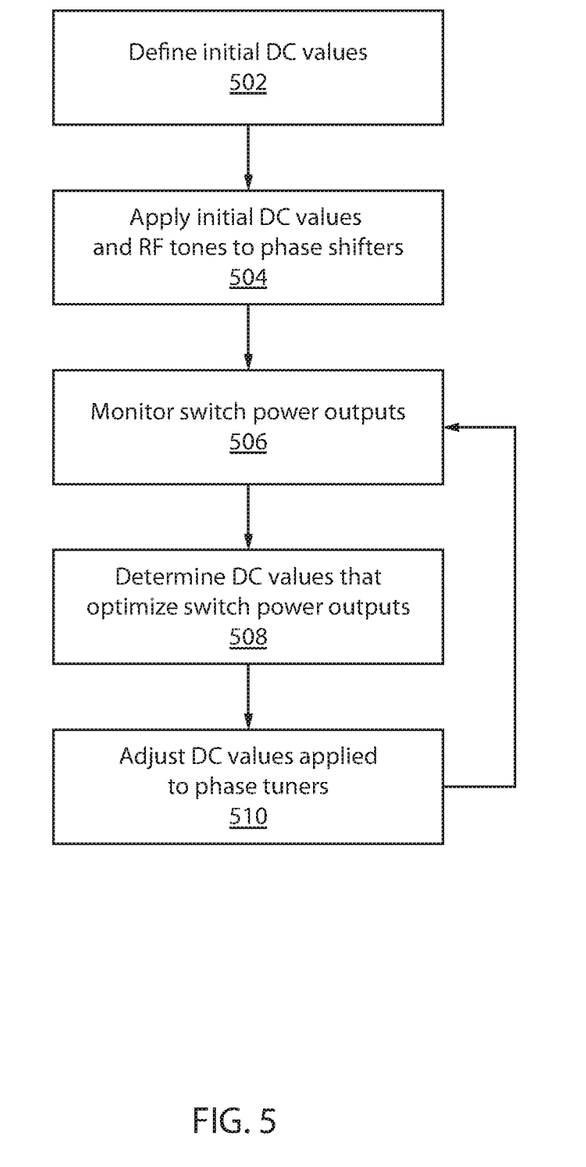
FIG. 5 is a block/flow diagram of a method of bias control in a switch fabric in accordance with the present principles.

Referring now to FIG. 5, a method of controlling bias in a switch fabric 300 is shown. Block 502 defines initial direct current values for the phase shifters that are used to set the switch position of the switching elements 301. Block 504 applies the initial direct current values to the switching elements 301 along with radio frequency tones used to uniquely identify the individual switching elements 301. These values may be applied as either electrical current or electrical voltage waveforms.

Block 506 monitors the power outputs of the switch fabric 300 using photodetectors 302. Reading the photodetector sensor values may include averaging over multiple samples to improve signal-to-noise ratio. Block 508 then determines new direct current values for the switching elements 301 that will optimize the switch power outputs, as described in greater detail below. Based on the optimization of block 508, block 510 adjusts the direct current values to the switching elements 301. Processing then returns to block 506 for ongoing monitoring. In this manner, the switch fabric 300 can be maintained at optimal levels at an arbitrary size.

Figure 6:
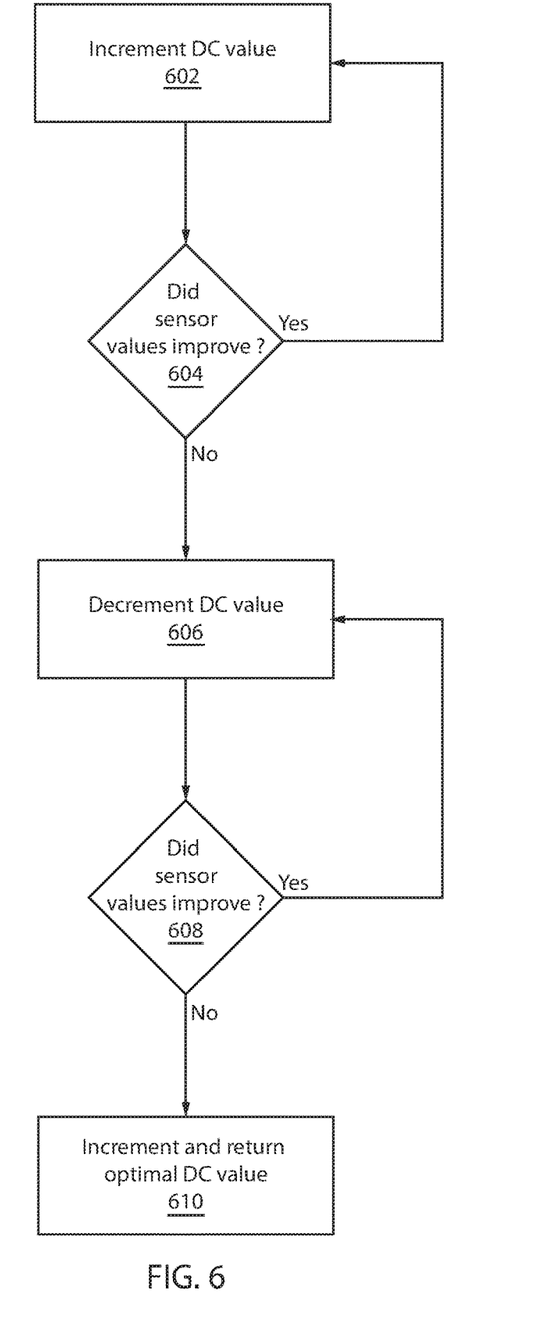
FIG. 6 is a block/flow diagram of a method of determining optimal bias control values in accordance with the present principles.

Referring now to FIG. 6, an exemplary method for determining optimal bias control values is shown. Block 602 increments the direct current value provided to a given switching element 301 and block 604 determines whether the resulting photodetector sensor values improve. Improvement is measured relative to a predetermined harmonic signature trait that may be, for example, a maximized or minimized specific harmonic frequency. In the case of a Mach-Zehnder switch element in push-pull operation, the bias point may be set at a $$\frac{\pi}{2}$$

phase difference between the branches. In single-ended operation, the in-phase bias point may be set at zero phase offset between the branches.

For a given bias point, specific harmonic signatures may be used. For example, the control unit 406 may find the in-phase bias point by maximizing the power of the second harmonic or minimizing the power in the first and third harmonics. It should be understood that this example is to be interpreted as instructive only, as the method of selecting a bias point may be based on many parameters, such as the amplitude of the applied radio frequency tone, power loss, and component non-linearities.

If the sensor values improve, processing returns to block 602 for further increases. If the sensor values do not improve, block 606 decrements the direct current value and block 608 determines whether the sensor values improved. If so, processing returns to block 606 for further decreases. If not, block 610 increments the direct current value (returning it to its previous, optimal value) and returns that optimal value. In this way, the bias value is iteratively adjusted until it converges on the optimal value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that the present invention will be described in terms of a given illustrative architecture having a wafer; however, other architectures, structures, substrate materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A design for an integrated circuit chip may be created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer may transmit the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

Methods as described herein may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 7:
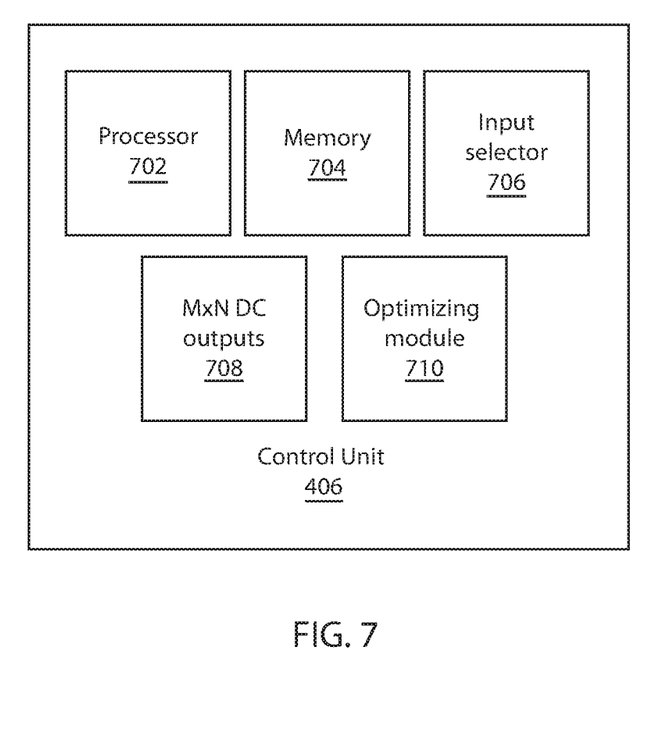
FIG. 7 is a block diagram of a control system for a switch fabric in accordance with the present principles.

Referring now to FIG. 7, the control unit 406 is shown in greater detail. The control unit 406 includes a hardware processor 702 and memory 704. The control unit 406 has one or more functional modules that, in one embodiment, may be implemented as software that is stored in memory 704 and executed on processor 702. In an alternative embodiment, the functional modules may be implemented as one or more discrete hardware components in the form of, e.g., application-specific integrated chips or a field programmable gate array.

An input selector 706 selects between the outputs of the power meters 404, providing feedback regarding the outputs of the individual switching elements 301. The control unit 406 has M×N direct current outputs 708 that are used to control the bias of the switching elements 301. An optimizing module 710 determines optimal values for the direct current outputs 708 based on inputs from the switching elements 301.

Figure 8:
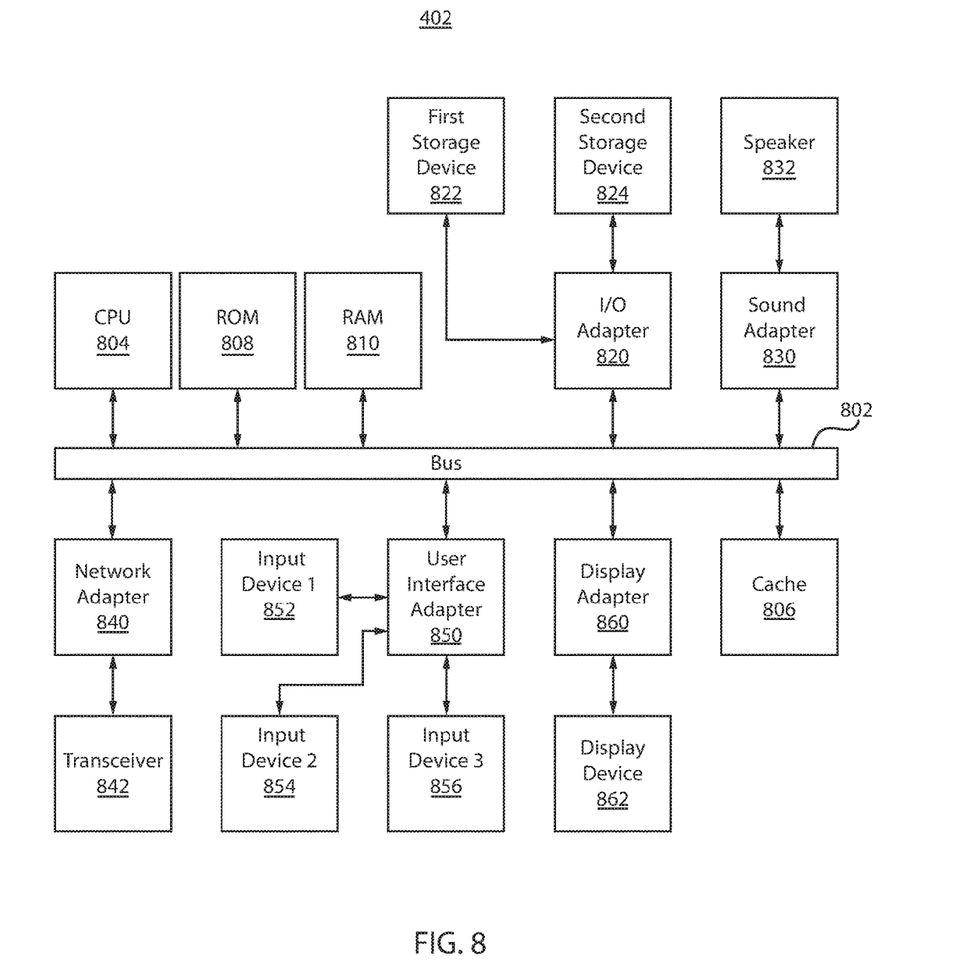
FIG. 8 is a block diagram of a processing system in accordance with the present principles.

Referring now to FIG. 8, an exemplary processing system 500 is shown which may represent the control unit 402. The processing system 402 includes at least one processor (CPU) 804 operatively coupled to other components via a system bus 802. A cache 806, a Read Only Memory (ROM) 808, a Random Access Memory (RAM) 810, an input/output (I/O) adapter 820, a sound adapter 830, a network adapter 840, a user interface adapter 850, and a display adapter 860, are operatively coupled to the system bus 802.

A first storage device 822 and a second storage device 824 are operatively coupled to system bus 802 by the I/O adapter 820. The storage devices 822 and 824 can be any of a disk storage device (e.g., a magnetic or optical disk storage device), a solid state magnetic device, and so forth. The storage devices 822 and 824 can be the same type of storage device or different types of storage devices.

A speaker 832 is operatively coupled to system bus 802 by the sound adapter 830. A transceiver 842 is operatively coupled to system bus 802 by network adapter 840. A display device 862 is operatively coupled to system bus 802 by display adapter 860.

A first user input device 852, a second user input device 854, and a third user input device 856 are operatively coupled to system bus 802 by user interface adapter 850. The user input devices 852, 854, and 856 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 852, 854, and 856 can be the same type of user input device or different types of user input devices. The user input devices 852, 854, and 856 are used to input and output information to and from system 402.

Of course, the processing system 402 may also include other elements (not shown), as readily contemplated by one of skill in the art, as well as omit certain elements. For example, various other input devices and/or output devices can be included in processing system 402, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 402 are readily contemplated by one of ordinary skill in the art given the teachings of the present principles provided herein.

Figure 9:
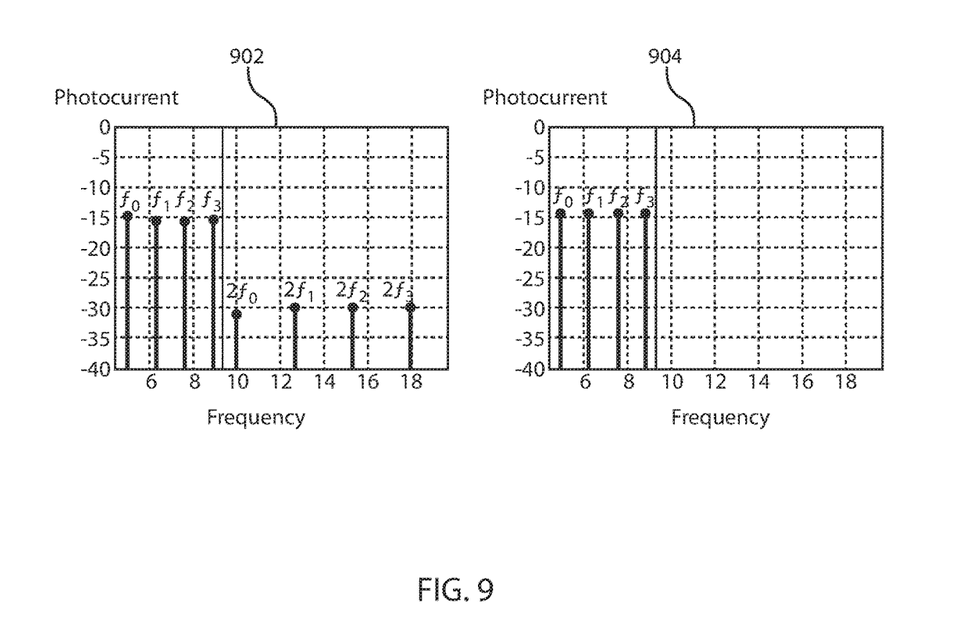
FIG. 9 is a comparison of graphs showing detector photocurrents before and after bias control.

Referring now to FIG. 9, a comparison is shown of the detected signal at the photosensors 302. The first graph 902 shows the multi-tone signal at the photosensors 302, with the desired signals $f_0$, $f_1$, $f_2$, $f_3$ on the left and their harmonics $2f_0$, $2f_1$, $2f_2$, $2f_3$ on the right, with frequency on the horizontal axis and detector photocurrent shown on a logarithmic scale on the vertical axis. Graph 902 represents an un-optimized photosensor 302 signal. The second graph 904 shows the multi-tone signal at the photosensors 302, with the desired signals $f_0$, $f_1$, $f_2$, $f_3$ on the left and the absence of their harmonics $2f_0$, $2f_1$, $2f_2$, $2f_3$ on the right. Graph 904 represents an optimized signal from photosensor 302.

Having described preferred embodiments of an optical switch fabric with bias control (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for bias control in an optical switch fabric, comprising:
    monitoring optical power at outputs of a plurality of switch elements in an N×N switch fabric that has N inputs, N outputs, and M≥2 stages, each switch element having a respective unique radio frequency tone;
    adjusting a bias control of a first of the plurality of switch elements;
    determining, using a processor, whether the optical power at the outputs of the first switch element after bias control adjustment conform more closely to a predetermined criterion relative to the monitored optical power at the outputs of the first switch element prior to adjustment; and
    repeating said steps of adjusting and determining for each of the remainder of the plurality of switch elements.

2. The method of claim 1, wherein each switch element comprises a Mach-Zehnder interferometer.

3. The method of claim 2, wherein determining the optical power at an output of a switch element comprises tapping one or more outputs of the Mach-Zehnder interferometer and measuring the tapped one or more outputs using a photodetector.

4. The method of claim 1, wherein monitoring the optical power at the outputs comprises tone demultiplexing N multi-tone outputs.

5. The method of claim 1, further comprising repeating said adjusting and determining until the monitored optical power at the outputs of the first switch element converge on an optimal value according to the predetermined criterion.

6. A non-transitory computer readable storage medium comprising a computer readable program for bias control in an optical switch fabric, wherein the computer readable program when executed on a computer causes the computer to perform the steps of claim 1.

7. The method of claim 1, wherein monitoring the optical power at the outputs of a plurality of switch elements comprises monitoring individual optical power at the outputs of every switch element in the switch fabric.

8. The method of claim 1, wherein monitoring optical power at the outputs of a plurality of switch elements comprises monitoring aggregate optical power from only those switch elements in a final stage of the switch fabric.

9. An optical switch fabric, comprising:
a plurality of switch elements in an N×N arrangement that has N inputs, N outputs, and M≥2 stages, wherein each switch element comprises a bias control configured to adjust a bias of the respective switch element and has a respective unique radio frequency tone;
a plurality of photodetectors configured to measure optical power at outputs of the plurality of switch elements;
a processor configured to trigger adjustment by the respective bias controls and to determine, for each switch element, whether the optical power at the output of each switch element conforms more closely to a predetermined criterion relative to the optical power at the output of that first switch element after an adjustment of that first switch element.

10. The optical switch fabric of claim 9, wherein each switch element comprises a Mach-Zehnder interferometer.

11. The optical switch fabric of claim 10, wherein the photodetectors are configured to tap and measure one or more outputs of the plurality of the Mach-Zehnder interferometers.

12. The optical switch fabric of claim 9, wherein the processor is further configured to demultiplexing N multi-tone outputs to determine an optical power at an output of each switch element.

13. The optical switch fabric of claim 9, wherein the processor is further configured to repeat said adjustment and determination until the monitored optical power at the outputs of the first switch element converge on an optimal value according to the predetermined criterion.

14. The optical switch fabric of claim 9, wherein the plurality of photodetectors are configured to monitor individual optical power at the outputs of every switch element in the switch fabric.

15. The optical switch fabric of claim 9, wherein the plurality of photodetectors are configured to monitor aggregate optical power outputs from only those switch elements in a final stage of the switch fabric.

\* \* \* \* \*